March 25, 1924.
J. P. LINDSAY
COMBINATION BOLT AND NUT LOCK
Filed Nov. 11, 1922
1,487,959
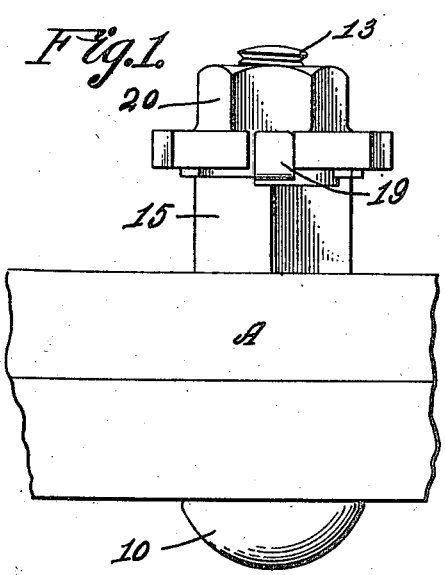
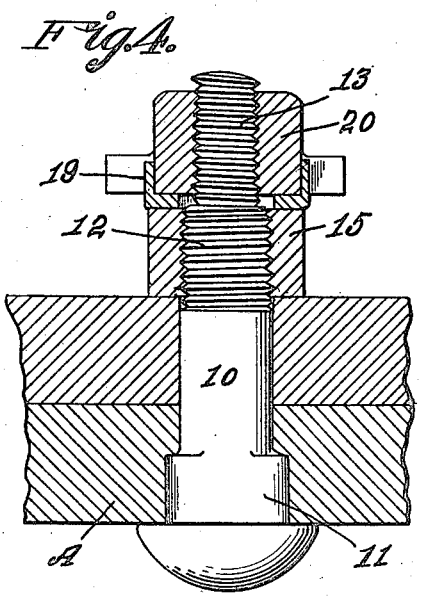
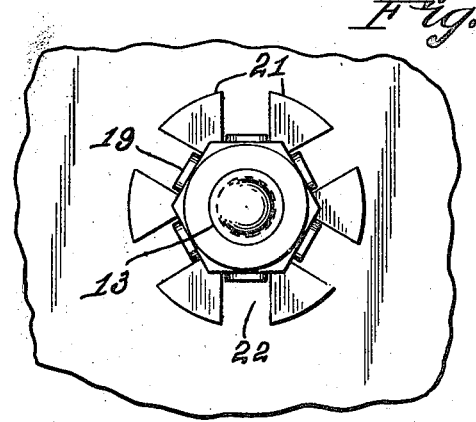
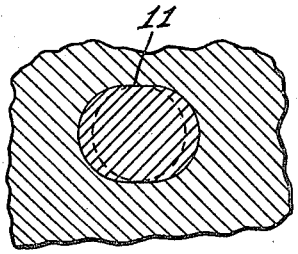
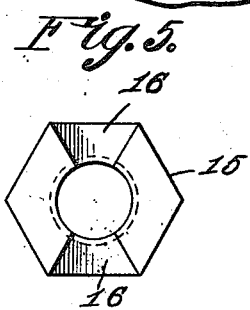
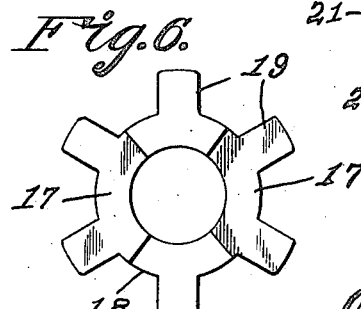
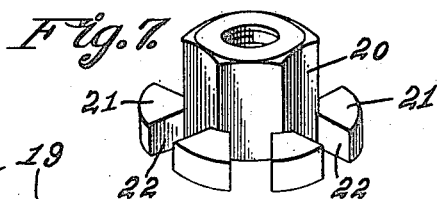
J. P. Lindsay
INVENTOR
BY Victor J. Evans
ATTORNEY Patented Mar. 25, 1924.

1,487,959

UNITED STATES PATENT OFFICE.

JOHN P. LINDSAY, OF RANDSBURG, CALIFORNIA.

COMBINATION BOLT AND NUT LOCK.

Application filed November 11, 1922. Serial No. 600,338.

*To all whom it may concern:*

Be it known that I, JOHN P. LINDSAY, a citizen of the United States, residing at Randsburg, in the county of Kern and State of California, have invented new and useful Improvements in Combination Bolt and Nut Locks, of which the following is a specification.

This invention relates to securing devices, particularly to nut locks, and has for its object the provision of a combination bolt and nut lock in which the arrangement of parts is such that any casual displacement of the nut will be positively and absolutely prevented even under the most trying circumstances.

Another object is the provision of a locking device of this character in which the arrangement is such that removal of the nut may be effected when desired for the purpose of disconnecting any parts held by the bolt.

With the above and other objects and advantages in view the invention consists in the details of construction to be hereinafter more fully described and claimed and illustrated in the accompanying drawings, in which:

Figure 1 is a side elevation of a bolt and nut structure constructed in accordance with my invention and showing the parts locked, Figure 2 is an end view, Figure 3 is a cross section taken right under the head of the bolt, Figure 4 is a longitudinal section through the bolt and locking structure, Figure 5 is an outside face view of the first nut, Figure 6 is an elevation showing the confronting face of the locking washer, Figure 7 is a perspective view of the second nut detached.

Referring more particularly to the drawings the letter A designates a couple of pieces of material or two objects to be secured together, and through these objects passes the bolt 10 which has a shank portion 11 which may be elliptical or angular in cross section so as to prevent the bolt from turning in its hole when the nuts, to be described are applied. This bolt is provided throughout the major portion of its length with right hand threads indicated at 12 while the end portion 13 is reduced and cut with a left hand thread.

The numeral 15 represents a nut which is screwed onto the large portion of the bolt and which is jambed tightly against the objects or material through which the bolt passes. The outer face of the nut is formed with two opposite fan shaped recesses 16 which receive correspondingly shaped projections 17 on the face of a locking washer 18 which is likewise engaged upon the large portion of the bolt and which is formed with a plurality of radial tongues 19.

Screwed onto the small left hand threaded portion of the bolt is a nut 20 having a flange 21 formed with notches 22 arranged at spaced intervals. In assembling the parts, the bolt is passed through the hole, the nut 15 is turned down to the right into jambing engagement with the objects or material and the locking washer 18 is placed against the outer face of the nut 15 with the projection 17 fitting within the recesses 16. The nut 20 is then screwed to the left into tight engagement with the locking washer until the tongues 19 register with the notches 22, and then one or more of the tongues is bent or mashed over into the slot or notch registering therewith. When the parts are thus assembled it is quite obvious that unscrewing of either nut will be positively prevented.

Whenever it is necessary to unscrew the nuts it is of course imperative that the tongues be broken off or bent so as to disengage the notches, whereupon the parts may be disassembled in an obvious manner.

From the foregoing description and a study of the drawings it will be apparent that I have thus provided a simply constructed and consequently inexpensive combination bolt and nut lock which will be highly advantageous as positively preventing any jarring loose of any of the parts and consequent separation of the objects or pieces of material secured by the bolt.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In combination, a bolt having one portion provided with a right hand thread and its remaining portion reduced and provided with a left hand thread, a nut threaded upon said right hand threaded portion and having its outer face formed with recesses, a washer engaged against the outer face of said nut and formed with projections fitting within said recesses, the outer periphery of said washer being formed with radially extending tongues, a nut engaged upon said left hand threaded portion and having a flange provided with notches, the tongues being adapted to be bent into said notches.

In testimony whereof I affix my signature.

JOHN P. LINDSAY.